E. B. ALLEN.
BUTTONHOLE CUTTING AND STITCHING MACHINE.
APPLICATION FILED SEPT. 6, 1912.

1,209,926.

Patented Dec. 26, 1916.
3 SHEETS—SHEET 1.

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE CUTTING AND STITCHING MACHINE.

1,209,926.    Specification of Letters Patent.    Patented Dec. 26, 1916.

Application filed September 6, 1912. Serial No. 718,804.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole Cutting and Stitching Machines, of which the following is a specification, reference being had therein to the accompanying drawings.

This invention has for its object to adapt buttonhole stitching machines, and more particularly that class employing rotary stitch-forming mechanism, for adjustment for cutting and stitching buttonholes of different sizes such as are required for different classes of cloth garments, to simplify and increase the capacity of the mechanisms heretofore employed in this class of machines, and to insure a clean cut in the formation of the buttonhole slit.

Heretofore, it has been customary in the cutting of the buttonhole slit to move the work-holder immediately before a cutting action into register with a non-traveling cutting device or else move the cutting device into register with a work-holder remaining in stitching position. The first of these expedients involved an excessive loss of time in shifting the work-holder slowly into cutting position or else moving it so quickly as to interfere with the operator's manipulation of the work all but simultaneously with its adjustment between the clamping jaws; while the second of such expedients involved a loss of time and liability to disarrangement of the parts in the displacement of portions of the stitch-forming mechanism or accessories thereof by the cutting device.

According to the present improvement, the cutting is produced out of but closely adjacent to the range of action of the stitch-forming mechanism in which position the work-holder is shifted at the completion of each buttonhole cutting and stitching cycle of the machine. By this means, no part or accessory of the stitch-forming mechanism is displaced by the cutting device, the work-holder may be opened immediately at the completion of a stitching action and the work shifted therein promptly and accurately adjusted for the succeeding operation while the work-holder remains at rest prior to and during the initial advance of the cutter to cutting position.

By the employment of cutter-carriers having relatively reciprocal cutting movements and carrying respectively a removable block and a cutting knife of the length of the longest buttonhole, slits of different length may be cut by the employment of a plurality of interchangeable blocks of different length opposed to the cutting edge of the longer knife, the length of travel of the work-holder from its initial position in which the cutting of the fabric is performed into stitching position being controlled relatively to the length of the slit so as to insure the starting of the edge-covering overseam at the small end of the latter, while the period of action of the stitch-forming mechanism may be controlled by an adjustable traveling tripping point for operating the stop-motion to arrest the stitching mechanism at the starting point relatively to the length of the slit.

In the preferred embodiment of the present invention, the cutting device occupies a normally retracted position remote from the stitch-forming mechanism, but is caused to advance to bring its cutting elements into register with the work-holder for a cutting action, after which it recedes rapidly into initial position, while means connecting its actuating mechanism with the feed-wheel for effecting the travel of the work-holder shifts the latter into the range of action of the stitch-forming mechanism and into a position to accurately locate the initial stitches at the closed end of the slit previously formed. The work-holder thus occupies an initial position intermediate the normal positions of the cutting device and the stitch-forming mechanism in respect to the combined lengths of relative traverse of the work-holder and the cutting device and stitch-forming mechanism, respectively, toward and from cutting position regardless of the relative directions of movement of such members which will be in practice straight, curved or angular, depending upon the relative normal positions of the cutting and stitching means. Any usual or suitable means may be provided to impart to the feed-wheel a step-by-step partial rotation to effect the advance of the work in spacing the edge-covering stitches, and at the completion of the stitching operation the feed-wheel is more rapidly advanced through a final partial rotation to restore the work-holder to initial cutting position preparatory to the approach to which and subsequent to the completion of the stitching the work-holder is automatically opened to release the work. By the means just described, the work-holder remains stationary preparatory to and during the cutting action, so that the work may be adjusted therein by the operator under the most favorable conditions possible, while the quick travel of the work-holder into stitching position subsequent to cutting produces only an inappreciable loss of time between the cutting and the beginning of the stitching. Prior to the return of the work-holder from stitching to cutting position at the completion of a cycle of operation of the machine, the work is released to enable the operator to lose no time in shifting it or replacing it by another object preparatory to the succeeding cutting operation.

The spreader for laterally separating the clamping elements of the work-holder to stretch the fabric is preferably operated while the cutting elements are closed upon the same in the cutting operation. This causes the tearing apart of any uncut threads of the fabric while firmly nipped between the cutting elements, and insures the freedom of the buttonhole slit from cross-threads which would impair the proper laying of the edge-covering stitches and mar the appearance of the finished buttonhole.

In the drawings, Fig. 4 is a perspective view showing the feed-wheel actuating and controlling mechanism and certain parts operatively connected therewith. Fig. 5 is a detached side elevation of the cutting mechanism, Fig. 6 a similar elevation taken from the opposite side of a part of such mechanism and Fig. 7 a perspective view upon an enlarged scale of the outer portion of the upper cutter-carrying lever and cutter-block detached therefrom. Fig. 8 is a plan of the feed-wheel and certain of the parts which it actuates. Fig. 9 is a perspective view of the spreader mechanism for the work-holder. Fig. 10 is a perspective view of a part of the stop-motion device. Fig. 15 is a perspective view representing portions of the clamp-closing and opening devices.

As represented in the drawings, the present machine is constructed in substantial accordance with my United States Patent No. 1,024,490, of April 30, 1912, as regards general constructive features, including the feed-wheel actuation, the cutter-shaft control and the stop-motion device; the stitch-forming mechanism being that of my United States Patent No. 1,030,046, of June 18, 1912. Excepting in certain particulars, the cutter mechanism is constructed in substantial accordance with my pending application Serial No. 593,784, filed November 23, 1910, and the work-holder is the same, excepting in certain details, as that disclosed in my pending application Serial No. 693,778, filed April 29, 1912.

As represented in the drawings, the frame of the machine is constructed with the hollow rectangular base 1 having a suitably apertured top forming a bed-plate 2 from the rear end of which rises the hollow standard 3 of the bracket-arm with forwardly extending tubular member 4 terminating in the hollow head 5.

Figures 3, 11, 12, 13, 14:
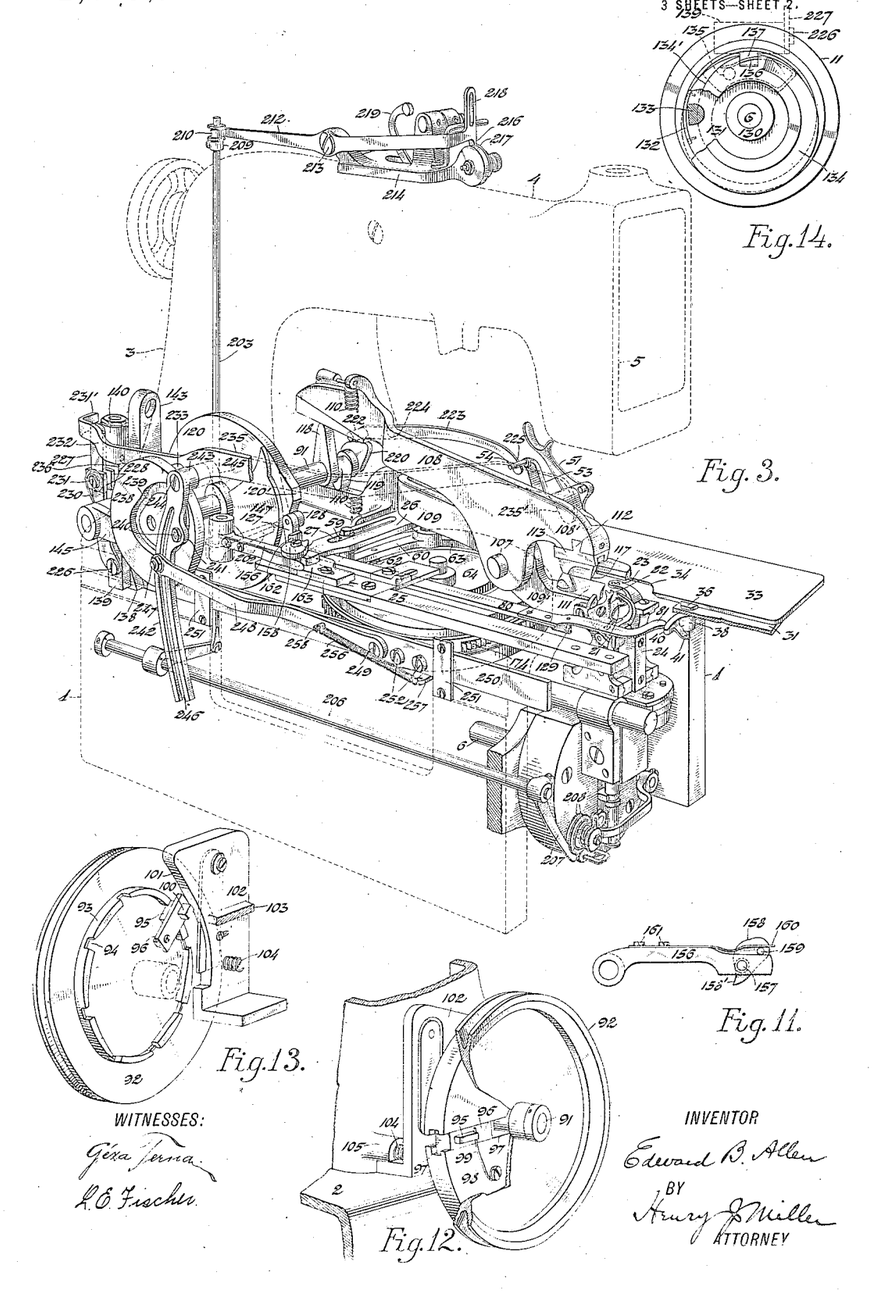
Fig. 3 is a perspective view representing the cutting and work-holder controlling mechanisms.
Fig. 11 is a plan of the under side of one arm of the stop-motion trip-lever.
Figs. 12 and 13 are perspective views representing the controlling means for the cutter-shaft.
Fig. 14 is a rear face view of the belt-wheel and stopping cam of the stop-motion device.

Suitably mounted in the base 1 is the rotary lower shaft 6 provided with quartering cranks 7 connected by pitmen 8 with similar cranks 9 of the upper or needle-driving shaft 10 journaled within the tubular arm 4. The main-shaft 6 carries the loose grooved belt-wheel 11. The needle-driving shaft 10 is connected with the intermediate shaft 12 by a trammel device 13 for imparting two rotations of the former to one of the latter, and the shaft 12 carries the crank-plate 14 having a pin connected by means of the pitman 15 with a similar pin upon the loose collar 16 fitted to and confined from endwise movement upon the rectilinearly reciprocating needle-bar 17 adapted for rotation with a bushing journaled in the bracket-arm head and carrying the yoke 18 in which is journaled the laterally jogging needle-clamp 19 carrying the eye-pointed needle 20. Coöperating with the jogging needle 20 is suitable loop-taking mechanism which is or may be constructed in accordance with my said Patent No. 1,030,046, and is shown in Fig. 3 in part only comprising the non-threaded looper 21 and overlying spreader 22 working beneath the needle-throat 23 sustained by the rotary turret 24 journaled beneath the work-plate.

The main slide-frame for supporting the work-holder comprises the side bars 25 fitted to suitable guideways upon the bed-plate and connected at the rearward ends by the cross-plate 26 formed with the slot 27. The apertured lugs 28 depending from the bars 25 sustain the transverse guide-rod 29 having slidingly fitted thereon the apertured lugs 30 depending from the cross slide-plate 31 adapted to rest upon the bed-plate.

Sustained by the cross slide-plate and pivoted thereto by means of the depending pins 32 are the swinging clamp-plates 33 normally drawn together by a spring to bring their adjacent edges close together, the usual clearance aperture 34 being formed in the adjacent marginal portions to accommodate the needle of the stitch-forming mechanism and the coöperating cutting elements of the slit-cutting device. The clamp-plates are recessed in the adjacent marginal portions of their lower faces to receive the contact-blocks 35 adapted to be forced apart to spread the work-holder by means of the interposed cam-button 36 mounted upon the rocking pin 37 which is journaled in the cross slide-plate 31 and has secured upon its lower end the hub 38 of a rock-lever formed with the oppositely extending arms 39 and 40, the latter having the lateral apertured finger 41 connected with one end of the spring 42 whose opposite end is attached by means of the screw 43 to the cross slide-plate for maintaining the rock-lever in normal unspreading position with its arm 39 yieldingly in contact with the stop-pin 44 of the cross slide-plate.

Each clamp-plate 33 has pivotally mounted thereon by means of the transverse fulcrum-pin 45 a rocking block 46 carrying the clamp-arm 47 with clamping foot 48, which is adapted to be depressed by means of the cam 49 mounted upon the rock-shaft 50. One of the rock-shafts 50 has secured upon its outer end the finger-lever 51 with connected rearwardly extending tappet-arm 52 and at the opposite end the radial arm 53 terminating in the lateral pin 54 arranged parallel with the rock-shaft. The other rock-shaft 50 has fixed upon its inner end the radial arm 55 formed in its outer extremity with the fork 56 adapted to embrace the pin 54, and has fixed upon its opposite end the lateral tappet-arm 57. Lifting springs 58 are interposed between each clamp-plate and the clamp-arm pivotally mounted thereon.

The main slide-frame derives its longitudinal traveling movements from a stud 59 entering the slot 27 and carried by the swinging lever 60 fulcrumed at 61 beneath the work-plate and provided intermediate its ends with the depending roller-stud 62 entering the cam-groove 63 of the feed-wheel 64. The slide-plate 31 has secured upon its lower face the block 65 longitudinally channeled to receive the roller-stud 66 carried by the rock-lever 67 fulcrumed at 68 and carrying at its opposite end the roller-stud 69 entering the side-shift groove 70 of the cam-wheel 64 from which the work-holder receives its lateral or side-shift movements.

The main-shaft 6 carries the cam-cylinder 71 provided with the peripheral groove 72 entered by the roller-stud 73 depending from a lever 74 fulcrumed beneath the work-plate upon the stud-screw 75. The lever 74 has pivotally connected therewith intermediate its ends one end of a link 76 whose opposite end has an adjustable pivotal connection with the slotted vibratory arm 77 actuating the cramping clutch-dogs 78 having jaws embracing the peripheral flange 79 of the feed-wheel 64 to which they are adapted to impart step-by-step rotary movements for communicating to the work-holder longitudinal feeding and lateral side-shift movements during the operation of the stitch-forming mechanism in applying the edge-covering overseam stitches.

Figures 4, 5, 6, 7, 8, 9, 10:
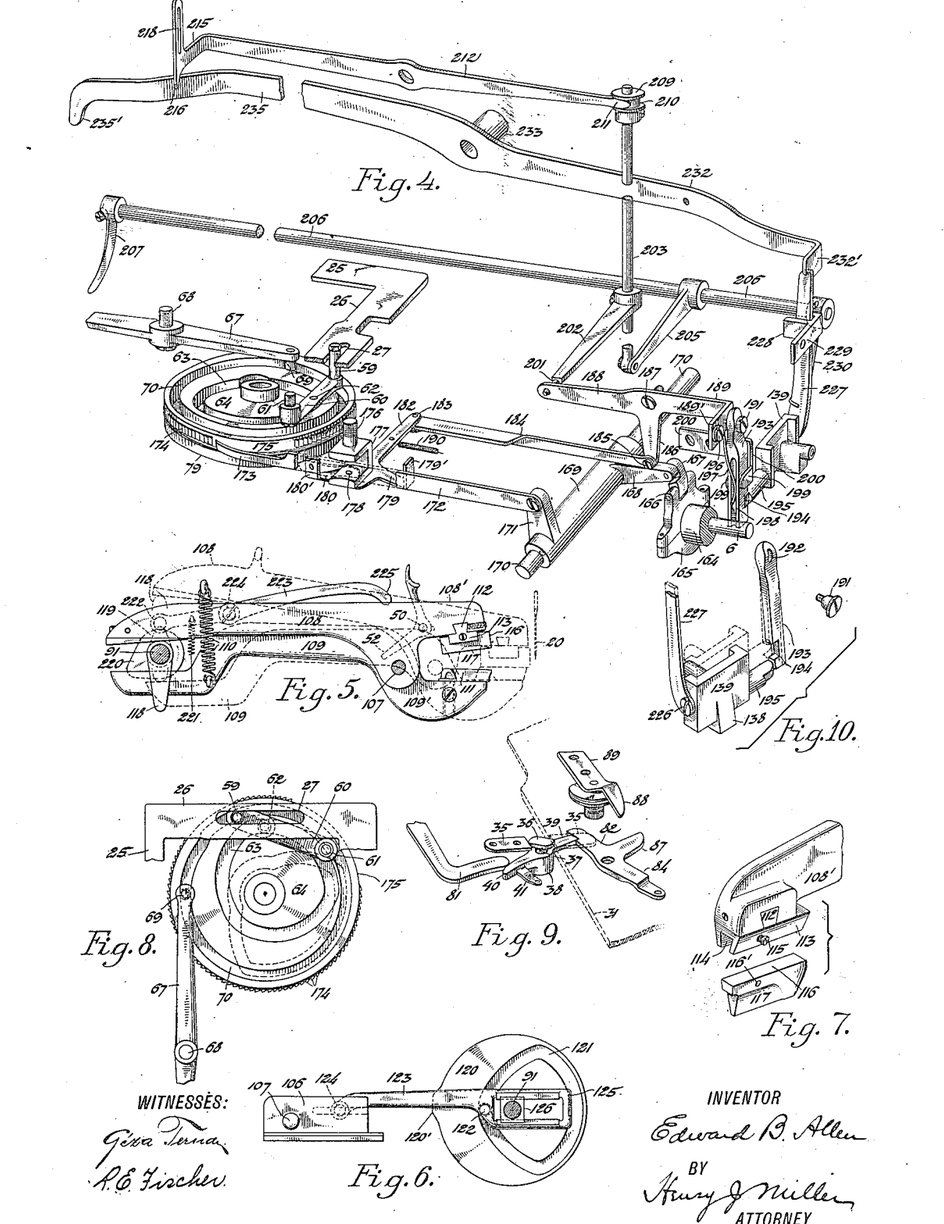

Mounted in the bed plate and suitably actuated by means to be described is the longitudinally disposed slide-bar 80 provided with the forwardly extending tripping finger 81 which is adapted, preparatory to each stitching operation, to advance into engagement with the spreader-arm 40 to turn it upon the pin 37 in opposition to the spring 42 for engagement of the extremity of the arm 39 by the notched detaining arm 82 of a plural-armed latch-lever fulcrumed upon the stud-screw 83 and formed with a second arm 84 whose apertured end is connected by means of the spring 85 with a plate 86 secured to one of the depending lugs 30 of the cross slide-plate. As the spreader-arm moves along the edge of the latch-lever arm 82, the shoulder of the latter snaps behind the forward edge of the former under the action of the spring 85, to maintain the cam-button 36 in spreading position, as represented in Fig. 9. The latch-lever partakes of the sidewise and endwise feeding movements of the slide-plate 31 under the action of the feed-wheel, and at the completion of a stitching operation its third lateral arm 87 encounters the end of a stationary tripping finger 88 formed upon a plate 89 secured by screws 90 upon a stationary portion of the frame, and the latch-lever is thereby rocked in opposition to its spring 85 to release the spreader-arm 39, thereby permitting the cam-button 36 to be returned to initial position under the action of the spring 42.

The cutter-actuating shaft 91 is mounted in the frame above the work-plate and transversely of the standard 3 and carries upon one end the constantly driven loose grooved belt-wheel 92 having upon its inner face the annular rib 93 formed with peripherally spaced notches 94 to afford a series of clutch-teeth adapted for engagement by the lug 95, which constitutes a coupling tooth, upon the rearward face of a slide-block 96 mounted in a radial slideway 97 of the clutch-disk 98 fixed upon the cutter-shaft adjacent the belt-wheel. The slide-block 96 is normally pressed outwardly by means of a spring 99 engaging the lug 95, and has upon its inner or rearward face a stud 100 adapted for operative engagement with the eccentrically curved cam-shaped edge 101 of a plate 102 carried by a lever 103 suitably fulcrumed upon the machine bed and adapted for movement toward and from the clutch-disk 98 toward which it is pressed by a spring 104 interposed between the plate 102 and the bottom of a socket therefor in a lug 105 projecting from the standard 3. The slide-block is held normally retracted in opposition to the spring 99 by engagement of its stud 100 with the cam-plate 102, but the manual retraction of the lever 103 (Fig. 2) disengages the cam-plate from such stud and permits the slide-block to move outwardly to engage its lug 95 with one of the notches 94 of the rib 93 of the belt-wheel, whereby the rotation of the cutter-actuating shaft is inaugurated; while the reëngagement of the stud 100 with the cam-plate 102, again restored to operative position by the action of the spring 104, retracts the lug 95 from the notch 94 and thus disengages the clutch-wheel 96 from the belt-wheel 92 at the completion of a single rotation of the shaft 91.

Mounted upon the bed-plate beneath the bracket-arm member 4 is the fulcrum-carrying slide-block 106 in which is journaled the fulcrum-pin 107 sustaining the upper and lower cutter-levers 108 and 109 which are drawn together rearward of the fulcrum-pin 107 by means of the spring 110 connected at its opposite ends with lateral lugs upon the respective cutter-levers.

Upon the forwardly projecting arm 109' of the lower cutter-lever is secured the cutting knife 111 comprising a sharp blade terminating at the rearward end in a round punch adapted to cut out the eye portion of the buttonhole slit. The forward arm 108' of the upper cutter-lever is formed with a transverse dove-tail seat entered by the correspondingly shaped tongue 112 of a transversely adjustable block 113 having in its lower face a longitudinal dove-tail shaped groove 114 in which is secured in position by means of the set-screw 115 the correspondingly shaped tongue 116 of the upper cutter member formed as a block or anvil 117 conforming in general shape and in register with the cutting knife 111. The tongue 116 is formed in one side with the recess 116' adapted to receive the point of the set-screw 115 to accurately position the same relative to the eyed end of the lower cutter member. The upper cutter member is readily removable by retraction of the fastening screw 115 and is replaceable by others of different length from the eye portion so as to support only so much of the fabric resting upon the lower cutting knife that it is desired to provide with the slit, the exposed portion of the blade 111, as represented in Fig. 3, being ineffective in the slit-cutting operation.

The cutter-shaft 91 has fixed thereon two cutter-lever actuating cams 118 and 119 acting respectively upon wearing faces afforded by the straight lower and upper edges of the upper and lower cutter-levers rearward of the fulcrum-pin 107, whereby they are tilted reciprocally for operation upon the work. The cutter-shaft 91 has also fixed thereon the cam-disk 120 having in one of its faces the cam-groove 121 entered by the lateral stud 122 carried by the link-bar 123 having an apertured end embracing a pivotal pin 124 adjustably secured in the fulcrum-block 106 and formed at its opposite end with a yoke 125 in which is fitted a slide-block 126 journaled upon the shaft 91. The cutter-actuating cams are so shaped and mounted upon the cutter-shaft that when the latter is at rest the cutting members 111 and 117 are separated and the cutter-carrying levers 108 and 109 are in retracted position, as represented in full lines in Fig. 5; but in the rotation of the cutter shaft they are shifted bodily forward and closed together, as represented in dotted lines in Fig. 5, and subsequently separated and retracted into the full line position of said figure preparatory to the completion of an operative rotation of the shaft 91.

As in the present embodiment of the improvement both cutting elements 111 and 117 perform their bodily traveling movements correspondingly in direction and extent with the lateral movements of the fulcrum-pin 107, such initial operative movements are made transversely of the needle-path, while their succeeding closing movements about the fulcrum-pin are in so short an arc that they are in a substantially straight line practically parallel with the straight needle-path. The object of this two-stage or compound movement is to enable the cutting elements to remain normally separated by only a sufficient space for their disengagement from the work and the work-supporting parts of the machine, so as to permit the employment of quickly and powerfully acting cutter-closing cams without abrupt or harsh operative portions; the retraction of the cutting elements from cutting position to expose the clamp for introduction and removal of the work within convenient view of the operator being effected by a similarly rapid bodily movement at a substantially right angle with the cutting movement under the action of a separate and independent cam.

The slide-bar 80 has at its rearward end an upwardly projecting arm 127 carrying the roller-stud 128 which is maintained by means of a spring 129 applied to the forward end of the bar 80 in constant rolling contact with the periphery of the cam-wheel 120, which is circular throughout excepting for a short distance on one side where it is provided with the projection 120' formed with convergently inclined end portions. The cam projection is so shaped and disposed relatively to the cutter-actuating cams that the slide-bar 80 is pushed forward just as the upper and lower cutters come together upon the fabric, thereby turning the clamp-spreading cam-button 36 to stretch the fabric at this stage of the slit-cutting operation, so as to insure the tearing apart of any partially cut threads of the fabric while they are pressed between the cutters and preparatory to the succeeding stitching operation.

Figures 1, 16:
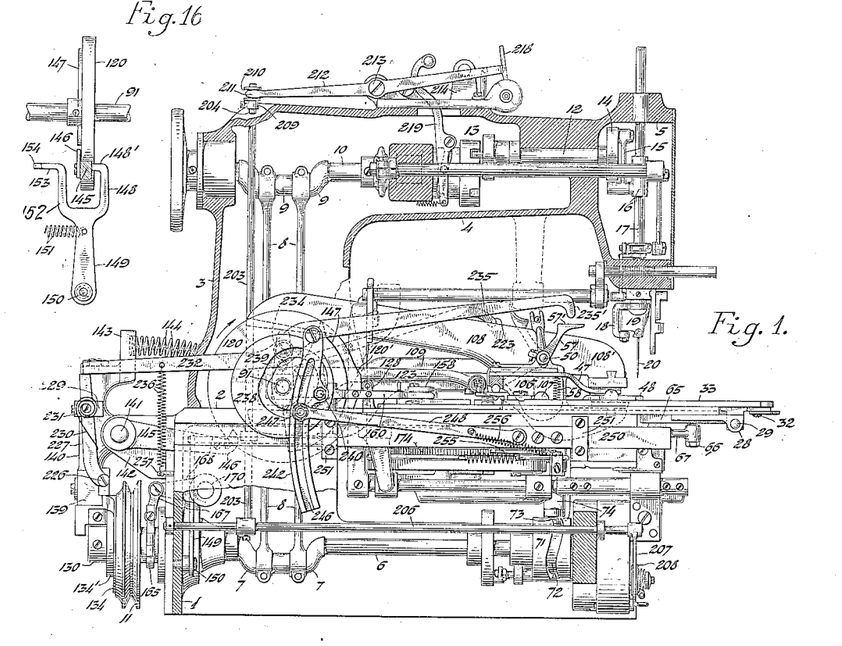
Figure 1 is a rear side elevation, with the frame in section, of a buttonhole cutting and stitching machine embodying the present improvements, and Fig. 2 a bottom plan of the same.
Fig. 16 is a detail view of a portion of the stop-motion mechanism.
Figures 2, 15:
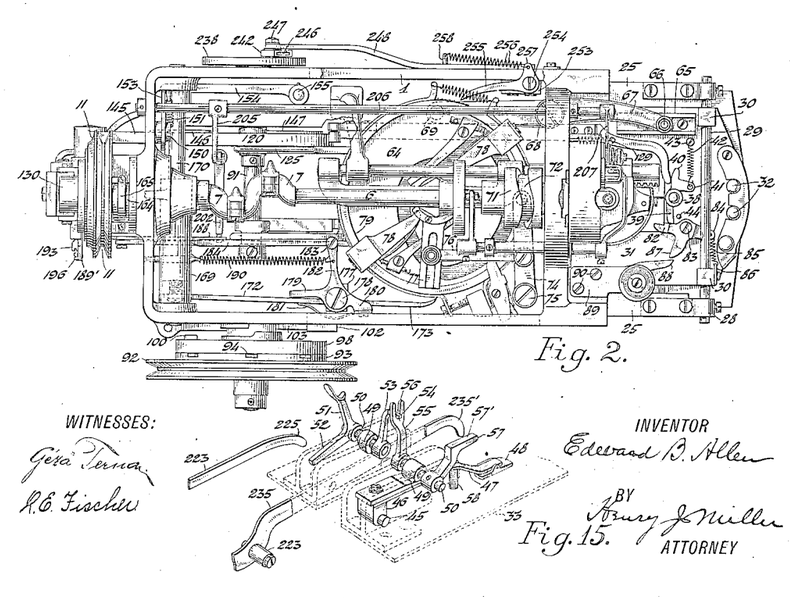

As represented more particularly in Figs. 1, 2 and 14, adjacent the loose driving pulley 11 is secured upon the main-shaft 6 the hub 130 of a clutch-wheel or disk 131 recessed at one portion of its periphery for reception of the clutch-plate 132 interposed between said wheel and the wall of a chamber for the same in the loose pulley, said wheel also having a segmental recess upon the inner side of said plate for the reception of a cam projection 133 upon a clutch-ring 134 which has a pivotal connection with said clutch-wheel by means of said projection to enable the clutch-ring to swing relatively to the clutch-wheel for causing the cammed or flattened outer portion of said projection to clamp the clutch-plate tightly against the wall of the chamber in the pulley 11 when the latter is to be clutched to the driving shaft.

The clutch-ring 134 is provided with a pin 135 extending within a recess in the clutch-wheel 131 containing a spring 136 bearing against said pin so as to force the parts laterally into clutching position, as shown in Fig. 14. The clutch-ring 134 is provided at its periphery with a notch 137 for the reception of the lug or projection 138 on a vertically movable spring-depressed block 139 carried by the vibratory stop-motion lever 140 pivotally mounted upon the rock-shaft 141 journaled in the bracket 142.

The stop-lever 140 has at its upper end a thrust-plate 143 between which and the bracket-arm standard 3 is interposed the spring 144 for shifting the lever into stopping position wherein the lug or projection 138 is caused to ride up the cammed periphery 134' of the clutch-ring 134 preparatory to entrance into the notch 137, whereby the block 139 is lifted under the action of the cam-edge 134' and is permitted to descend under the action of its spring as the projection 138 comes into register with the notch 137.

Fixed upon the rock-shaft 141 is a rigid arm 145 carrying a wearing plate 146 normally lying within the range of movement of the cam-plate 147 secured to the rearward face of the cam-wheel 120 and by means of which the arm 145 is depressed to tilt the stop-lever 140 in opposition to the spring 144. As the arm 145 descends, it is engaged by the inturned finger 148' of the member 148 of a yoke formed at the upper end of the locking lever 149 fulcrumed at 150 and drawn into such locking position by means of the spring 151. The other member 152 of the locking-lever yoke has a lateral finger 153 lying within the range of movement of the rearwardly extending tripping lever 154 mounted upon the lower end of the rock-shaft 155 journaled in the work-plate 2 and having at its upper end the forwardly extending arm 156.

Pivotally mounted by means of the fulcrum-stud 157 upon the outer end of the arm 156 is the cam-plate 158 having depending adjacent the rearward edge of said arm a pin 159 pressed normally against the edge of the arm by means of a flat spring 160 secured to the edge of the same by screws 161. The nose 158' of the cam-plate, which projects beyond the forward edge of the arm 156, normally lies within the path of movement of the tripping stud 162 carried by the plate 163 which is adjustably mounted upon the rearward member 25 of the main slide-frame. As the work-holder moves forwardly from the position represented in Figs. 1 and 3, the tripping stud 162, in its encounter with the nose 158' of the cam-plate 158, turns the same aside in opposition to the spring 160, but on its return movement at the completion of a stitching operation, its turning by engagement with the inclined edge of the nose 158' is prevented by contact of the pin 159 with the opposite edge of the arm 156, which latter is thus thrust aside, causing the shifting of the tripping arm 154 and disengagement of the latch-lever 149 from the stop-lever arm 145, thereby permitting the parts to assume stopping position under the action of the spring 144.

The hub of the loose pulley-wheel 11 is provided with an eccentric 164 embraced by a strap 165 having a forked lug 166 connected by means of the link 167 with the rearwardly extending arm 168 of a rocking sleeve 169 which is journaled upon the cross-shaft 170 and provided with an upwardly extending arm 171. The arm 171 is pivotally connected with the rearward end of a reciprocating pawl-bar 172 having at its forward end the reduced operative portion 173 whose wedge-shaped extremity is adapted to engage the segmental series of ratchet-teeth 174 extending nearly around the entire periphery of the feed-wheel 64 but interrupted for a small proportion of the circumference at 175 upon which the pawl-member 173 is adapted to reciprocate idly.

Secured to the bottom of the bed-plate by means of the stud-screw 176 is the hanger 177 upon the under side of which is pivotally mounted by means of the screw-pin 178 a plural-armed pawl-controlling lever provided with the oppositely extending arms 179 and 180 formed respectively with upturned lips 179' and 180' upon opposite sides of the pawl-bar 172, the latter having secured thereto a spring 181 normally pressing the pawl-bar yieldingly against the lip 179' of the arm 179. Said plural-armed lever has a third angularly disposed arm 182 pivotally connected by the screw-pin 183 with the forward end of a pitman-rod 184 whose opposite end is connected by the screw-pin 185 with the depending arm 186 of a rock-lever fulcrumed upon the stud-screw 187 and having a forwardly extending arm 188 and a rearwardly extending arm 189. A spring 190 attached at one end to the rear wall of the base and at the opposite end to the arm 182 tends to turn the arm 179 upon the fulcrum-screw 178 in such manner as to normally hold the pawl-bar 172 out of engagement with the feed-wheel.

The rock-lever arm 189 is formed at its rearward extremity with a lateral extension 189' sustaining the ball-stud screw 191 entering the aperture 192 in the upper end of a depending link 193 which is formed in its lower portion with the lateral notch 194 to receive the laterally extending stud 195 of the block 139 carried by the stop-lever 140. Secured to the lever extension 189' by means of the screw 196 is the wire spring 197 whose free end enters the groove 198 in the edge of the link 193 and maintains it pressed backwardly between the spaced stop-lugs 199 of and normally in contact with the plate 200 which is in practice secured to the machine frame. When the main-shaft is locked from turning by the stop-motion, the stud 195 is embraced by the notch 194 which maintains the link 193 in its lower position to position the pawl-controlling lever for operative engagement of the pawl-member 173 with the periphery of the cam-wheel 64. The tilting of the stop-lever 140 to disengage the block 139 from the clutch-ring 134 in starting the machine shifts the stud 195 laterally out of the notch 194 of the link 193, thereby releasing the link and its connections with the pawl-controlling lever, which latter is shifted by the spring 190 to throw the pawl member 173 out of operative relation with the feed-wheel in which it continues to perform idly its jogging movements imparted by the actuating eccentric 164. The tripping of the stop-lever by the means heretofore described causes the latter to return to initial stopping position under the action of the spring 144, thereby throwing the rounded end of the stud 195 forward against the notched edge of the link 193 which is pressed aside edgewise until the rise of the block under the action of the cam 134' lifts it sufficiently to bring the stud 195 into register with the notch 194, when the link returns to engagement with the plate 200 under the action of the spring 197 so as to again embrace the stud 195 which latter draws the link downwardly in opposition to the spring 190 as the block 139 descends in the final stopping position of the parts. The return of the pawl-member 173 into operative relation with the ratchet-teeth 174 then presented to it enables it to impart a comparatively rapid step-by-step work-shifting movement to the feed-wheel to complete a revolution, at the end of which the pawl-member 173 encounters the gap 175 between the extreme ratchet-teeth of the series and the feed-wheel comes to rest in readiness for a succeeding cycle of operation of the machine.

The arm 188 is formed in its outer end with an aperture entered by a pin 201 at the extremity of a rigid lateral arm 202 secured upon a rod 203 journaled near its upper end in an aperture 204 in the top of the bracket-arm and pivotally connected at the lower end with the lateral arm 205 fixed upon the rock-shaft 206 which is journaled in the base 1 and carries at its forward end a tension-releasing arm 207 adapted to enter between the thread-engaging disks 208 of the lower-thread tension device to separate them for relief of the tension upon the thread. The rod 203 has secured upon its upper end the collar 209 formed with a neck 210 entered by the rounded extremity 211 of a rock-lever 212 fulcrumed at 213 upon the tension bracket 214 and formed t its opposite end with a lateral extension 215 having a depending wedge-shaped finger 216 which is adapted to enter between and separate the thread-engaging disks 217 of the upper tension device to relieve the tension upon the upper thread. The extension 215 of the tension release lever 212 is shown provided with a thread-guiding loop 218 through which the thread is led from the take-up lever 219 to the upper end of the tubular needle-bar.

The cutter-shaft 91 is shown provided adjacent the cutter-actuating cam 119 with a clamp-closing cam 220 in contact with which is held by the spring 221 the lateral stud 222 upon the rearward end of the clamp-closing lever 223 supported intermediate its ends at 224 independently of the cutter-carrying levers and having a down-turned forward extremity 225 adapted for engagement with the lateral arm 52 of the clamp rock-shaft 50. As will be seen from Figs. 3 and 5, the clamp-closing cam 220 is set slightly in advance of the upper cutter-lever actuating cam 118, and the rock-lever 223 thus performs its clamp-closing movement during the tilting of the cutter-lever 108 and completes its clamp-closing action just prior to the final closing of the cutter members upon the fabric to cut a buttonhole slit.

The spring-pressed block 139 has upon its edge opposite the stud 195 a stud-pin 226 upon which is pivotally mounted the swinging lever 227 whose upper portion is embraced by the spaced ears 228 of the guide-bracket 229 sustained by the stop-lever and carrying a spring 230 secured thereon by the screw 231 by means of which the rearward edge of the lever 227 is normally held in contact with the bracket 229, as represented in Fig. 4. Extending normally above the upper end of the lever 227 is a lateral extension 232' of the rearward arm 232 of a clamp-opening rock-lever having intermediate its ends the boss 233 mounted upon the fulcrum-pin 234 sustained by the standard 3 and having a forwardly extending arm 235 with downturned and rounded extremity 235' normally disposed slightly above the flat operative portion 57' of the tappet-arm 57 upon one of the clamp-operating rock-shafts 50. The rearward arm 232 of the clamp-opening rock-lever is normally drawn downward to maintain it disengaged from the tappet-arm 57 by means of the spring 236 connected with a pin 237 extending from the base 1. The tripping lever 227 is moved backward and forward beneath the lever-arm extension 232' in the operative movements of the stop-lever for starting and stopping the main-shaft, and when the stop-lever assumes stopping position, the rise of the block 139 under the action of the cam 134' causes the bodily ascent of the lever 227 which tilts the clamp-opening lever in opposition to the spring 236, thereby depressing the tappet-arm 57 to turn the rock-shafts 50 for the release of the work-clamp arms 47. In case of the breakage of the thread during a stitching operation, the work may be held undisturbed after the stoppage of the stitch-forming mechanism by the manual shifting forwardly of the lever 227 in opposition to its spring 230, so as to hold such lever clear of the lever-arm extension 232' as the block 139 rises under the action of the cam 134'.

The cutter-shaft 91 has fixed upon its rearward end the disk 238 having in its rearward face the cam-groove 239 entered by a roller-stud 240 sustained upon a lateral projection 241 of a swinging segmental lever 242 having its hub 243 fulcrumed upon the stud-screw 244 which is sustained by the bracket 245 (Fig. 3) of the standard 3. The lever 242 is formed with an undercut groove 246 in which is adjustably secured the stud 247 embraced by the rearward end of a link-bar 248 whose apertured opposite end is entered by the stud-screw 249 tapped into the slide-bar 250 mounted in a suitable guideway of the base in which it is confined by the straps 251. Secured to the inner face of the slide-bar 250 by means of the screws 252 is a block 253 carrying a stud-screw 254 upon which is mounted the pawl 255 maintained in operative relation with the ratchet-teeth 174 of the feed-wheel 64 by means of a spring 256 having one end attached to an apertured lateral lug 257 of the pawl 255 and the opposite end connected with a pin 258 sustained by the link-bar 248.

The feed cam-groove 63 is so shaped and proportioned that at the completion of a rotation of the cam-wheel 64 when the operative extremity of the pawl-member reaches the gap 175 between the ratchet-teeth 174, the work-clamp assumes the fabric cutting position at the opposite side of the stitch-forming mechanism from its work-advancing position occupied during the stitching operation, and intermediate the stitching position and the retracted position of the cutting device. Upon the actuation of the cutter-shaft controlling lever 103 to produce an initial rotation of the cutter-shaft 91, the cutting members 111 and 117 first advance bodily toward the stitch-forming mechanism into cutting relation with the work-holder and then close upon the work, after which they are separated and retracted to initial position. During the advance of the cutting device to cutting position, the lever 242 moves forward to advance the pawl 255, and just after the cutting members are separated the continuous backward movement of the lever 242 causes the corresponding movement of the pawl 255 which imparts to the feed-wheel a work-shifting movement through an arc whose length is determined by the adjustment of the stud 247 within the groove 246 of the lever 242. This comparatively rapid continuous movement of the feed-wheel advances the work-holder from cutting position into initial stitching position wherein the end of the buttonhole slit is disposed in the proper relation with the range of action of the stitch-forming mechanism to begin the stitching. The length of the travel of the cutting device from retracted position into cutting position adjacent the stitch-forming mechanism is invariably the same for the various sizes of buttonholes, and therefore the lower cutting member 111 always assumes the same operative position, variations in the length of slit produced being effected by the use of interchangeable upper cutting members 117 whose eye portions invariably register with that of the lower member, but whose blade portions are of lengths corresponding respectively with the sizes of slit desired. The lower cutter member is of a length corresponding with the longest buttonhole which the machine is designed to produce, and is thus adapted for coöperation with an interchangeable set of upper cutter members or anvil blocks. As the position of the initial stitch will vary with the length of slit produced, it is evident that the length of movement of the work-holder between cutting and stitching positions should vary accordingly, and this is accomplished in the present machine by varying the operative throw of the pawl 255 as before described to produce the necessary initial arc of movement of the feed-wheel for such purpose.

When the machine is at rest, the work-holder is in cutting position at one of the extremities of its uniform range of traverse, with its clamping members separated for introduction of the work; and the cutting device is in its extreme retracted position beyond the work-holder relatively to the stitch-forming mechanism and with its cutting elements separated. In this initial stationary position of the work-holder the operator has ample time for insertion and proper positioning of the work between the clamping members preparatory to the manual actuation of the cutter-controlling lever 103, whereby the cutter-shaft is set in motion. The cutter-levers 108 and 109 are first advanced toward cutting position and the clamp-closing lever 223 is rocked at substantially the completion of such advance movement by the cam 220 to depress the tappet-arm 52 into clamp-closing position immediately following which the cutter-members close upon the fabric thus securely clamped in the work-holder. The position of the parts at this stage of the cutting and stitching cycle is represented in Figs. 1 and 3. Just as the cutting members come together upon the work, the spreader cam-button 36 is turned to spread the work-holder under the action of the cam-projection 120', and during the separation and retraction of the cutter-members 111 and 117 the feed-wheel 64 receives its initial turn from the pawl 255 to shift the work-holder into operative relation with the stitch-forming mechanism.

The stop-lever 140 being shifted by action of the cam-plate 147 prior to the completion of a full rotation of the cutter-shaft 91, the stitch-forming mechanism is set in motion and during its operation the feed-wheel receives its normal step-by-step slow feed-actuating movement from the reciprocating clutch-dogs 78 which proceeds throughout the continued retreat of the work-holder from cutting position and return toward the same until the tripping lug 162 encounters the nose 158' of the cam-plate 158 which it thrusts aside, carrying with it the arm 156 which shifts the tripping arm 154 for release of the stop-lever 140 which assumes stopping position under the action of its spring 144. The rise of the block 139 under the action of the cam-edge 134' of the clutch-ring 134 causes the shifting of the normally retracted but constantly jogging pawl member 173 into operative relation with the ratchet-teeth 174 of the cam-wheel 64 and at the same time actuates the tension release members 207 and 216 to relieve the tension upon the upper and lower threads for convenient removal or other manipulation of the work. The step-by-step return movement of the feed-wheel to initial position under the action of the pawl-member 173 causes the return of the work-holder to initial cutting position at an increased rate of speed over the normal feeding action, preparatory to which the engagement of the lever 227 with the clamp-opening rock-lever 232 235 causes the depression of the tappet-arm 57 to turn the clamp rock-shafts 50 for release of the clamp-arms, which obviously occurs immediately at the completion of the stitching, so that the work is released from the work-holder for shifting for a succeeding operation or for removal even while the work-holder is effecting its travel to initial cutting position. It will thus be seen that the present machine provides for precision of adjustment of the work within the work-holder while the latter is stationary and in initial position, that the closing of the clamp and cutting of the slit are effected rapidly and the work-holder shifted into stitching position and the stitch-forming mechanism thrown into operation almost instantly after the actual cutting operation has been performed.

The time during which the feed-wheel completes a rotation after the stitching, to effect the travel of the clamp to initial cutting position and the unspreading of the same and to produce the return rotation of the stitching mechanism, is utilized for the shifting or removal of the work preparatory to a succeeding cutting and stitching operation.

The reciprocal operative or cutting movements of the cutter-levers derived from the cams 118 and 119 are preferably very short, so that if they should occupy the cutting position at all times the upper member 117 would be positioned directly over the work-holder, partially obstructing the view and thus interfering with the proper location of the buttonhole in the garment. It is therefore found desirable in practice to employ a traveling cutting device, in order that in retracted position the cutting members or elements will be entirely out of the operator's way. Rather than impart to the cutting members an excessively long range of travel to this end, it has been found preferable to give to the work-holder a reciprocal movement which is differentially timed relatively thereto in the movement toward cutting position and substantially simultaneous therewith in the retrograde movement therefrom as previously explained.

From the foregoing description, it will be seen that the present mechanism contains many features which contribute to the efficiency and speed-capacity of the machine, certain of which may be used advantageously in some cases without the others, and all of which are susceptible to modification in details of construction and form, without departure from the present invention.

Having thus set forth the nature of the invention, what I claim herein is:—

1. In a buttonhole sewing machine, the combination with stitch-forming mechanism and a cutting device normally spaced apart laterally, and a work-holder, of means whereby said work-holder and cutting device are caused to assume operative relation in a position intermediate the stitch-forming mechanism and the normal position of the cutting device, and actuating means for said cutting device.

2. In a buttonhole sewing machine, the combination with stitch-forming mechanism, and a traveling cutting device normally occupying a retracted position remote from the stitch-forming mechanism, of a work-holder, means for imparting thereto feeding movements to space the stitches, means for shifting the work-holder into and out of cutting position intermediate the stitch-forming mechanism and the retracted position of the cutting device, and means for moving the cutting device into cutting position in operative relation with the work-holder.

3. In a buttonhole sewing machine, the combination with stitch-forming mechanism, of a cutting device comprising opposed cutting elements normally retracted from cutting position, a work-holder adapted to be shifted into and out of said cutting position, and means for imparting to said work-holder and both cutting elements of the cutting device traveling movements laterally toward said cutting position preparatory to each cutting action.

4. In a buttonhole sewing machine, the combination with stitch-forming mechanism including a reciprocating needle and means for interrupting the action of the same, of a cutting device movable toward and from said needle and in a direction at an angle with the same, a work-holder, and means acting while the stitch-forming mechanism is inactive and preparatory to each cutting action for imparting to said work-holder and cutting device traveling movements toward each other and subsequent return movements toward and from the needle-path.

5. In a buttonhole sewing machine, the combination with stitch-forming mechanism including a reciprocating needle and means for interrupting the action of the same, of a cutting device movable toward and from said needle and in a direction at an angle with the same, a work-holder, and means acting while the stitch-forming mechanism is inactive and preparatory to each cutting action for imparting to said work-holder and cutting device traveling movements toward each other and for imparting thereto simultaneous retractive movements after each cutting action, said traveling and retractive movements being performed in directions at a substantial angle with the needle-path.

6. In a button-hole sewing machine, the combination with stitch-forming mechanism and means for interrupting the action of the same, a work-holder, and a cutting device adapted to perform its cutting actions out of the range of action of the stitch-forming mechanism, of means including two independently actuated trains of mechanism acting while the stitch-forming mechanism is inactive for effecting the movement of the work-holder from stitching position into cutting position at one rate of speed and its return to stitching position at a higher rate of speed.

7. In a buttonhole sewing machine, the combination with stitch-forming mechanism, a work-holder, and a cutting device adapted to perform its cutting actions out of the range of action of the stitch-forming mechanism, of means for imparting to the work-holder a step-by-step travel from stitching to cutting position and a single step return movement to stitching position.

8. In a buttonhole sewing machine, the combination with stitch-forming mechanism, a work-holder, a traveling cutting device adapted to perform its cutting actions out of the range of action of the stitch-forming mechanism, and actuating means therefor, of means for shifting the work-holder from stitching to cutting position, and means acting during the operation of said actuating means whereby the work-holder begins its return to stitching position during the period of operation of the cutting device.

9. In a buttonhole sewing machine, the combination with stitch-forming mechanism, a work-holder, and a cutting device with actuating means therefor whereby said cutting device is adapted to perform its cutting actions out of the range of action of the stitch-forming mechanism, of means independent of said actuating means for shifting the work-holder from stitching to cutting position, and means operatively connected with said actuating means for returning the work-holder to stitching position.

10. In a buttonhole sewing machine, the combination with stitch-forming mechanism and feeding mechanisms, a work-holder and a cutting device adapted to perform its cutting actions out of the range of action of the stitch-forming mechanism, of means acting through a member of the feeding mechanism for shifting the work-holder from stitching into cutting position, and means independent of said means whereby the work-holder is caused to reassume stitching position.

11. In a buttonhole sewing machine performing a cycle of operation comprising a fabric cutting action followed by a stitching action, the combination with stitch-forming mechanism including a reciprocating needle confined to a fixed range of movement by a laterally fixed bearing, a traveling work-holder and a cutting device adapted to perform its cutting actions out of the range of action of the stitch-forming mechanism and comprising a cutting element having a path of movement of which a portion is substantially parallel with the direction of travel of said work-holder, of means for imparting traveling movements to the work-holder whereby the latter is caused to assume and remain in cutting position at the completion of a cycle, and actuating means acting at the beginning of the succeeding cycle for imparting to the cutting device a cutting action preparatory to the initial travel of the work-holder.

12. In a buttonhole sewing machine, the combination with overseaming stitch-forming mechanism including a reciprocating needle having a range of movement relative to a fixed axis limited to the width of overseam, a work-holder, and a cutting device adapted to perform its cutting actions out of the range of action of the stitch-forming mechanism and comprising a cutting element having a path of movement of which a portion is substantially parallel with the direction of travel of said work-holder, of means for imparting to the work-holder feeding movements within the range of action of the stitch-forming mechanism, means for actuating the cutting device, and means whereby the work-holder is shifted into cutting position at the completion of a cycle of operation of the machine and is returned to operative relation with the stitch-forming mechanism after the beginning of a succeeding cycle.

13. In a buttonhole sewing machine, the combination with stitch-forming mechanism, a work-holder, and a cutting device adapted to perform its cutting actions out of the range of action of the stitch-forming mechanism, of a rotary feed-wheel for moving the work-holder between cutting position and the extreme stitching position more remote therefrom, means for imparting to said feed-wheel a partial rotation to move the work-holder for spacing the stitches during the action of the stitch-forming mechanism, and means acting upon the feed-wheel and disconnected therefrom during each cutting operation, for completing the rotation of the latter and shifting the work-holder into cutting position.

14. In a buttonhole sewing machine, the combination with stitch-forming mechanism, feeding mechanism including a rotary feed-wheel with periodically operating actuating means therefor, and cutting mechanism with means independent of the feed-wheel for actuating it, of means for establishing driving relation between the feed-wheel and the cutting mechanism during the inactive periods of said feed-wheel actuating means.

15. In a buttonhole sewing machine, the combination with stitch-forming mechanism, cutting mechanism including traveling and relatively movable cutting elements, and feeding mechanism including a rotary feed-wheel with periodically operating actuating means therefor, of means deriving from the cutting mechanism, traveling movements timed substantially correspondingly with those of said cutting elements and adapted to turn the feed-wheel independently of said actuating means.

16. In a buttonhole sewing machine, the combination with stitch-forming mechanism, cutting mechanism, and feeding mechanism with periodically operating actuating means therefor, of means including a ratchet-and-pawl connection between the cutting mechanism and the feeding mechanism whereby the latter is operated independently of said actuating means.

17. In a buttonhole sewing machine, the combination with stitch-forming mechanism, cutting mechanism, and feeding mechanism including a rotary feed-wheel with periodically operating actuating means therefor, of means including a ratchet-and-pawl connection between the cutting mechanism and the feed-wheel whereby the latter is turned independently of said actuating means.

18. In a buttonhole sewing machine, the combination with stitch-forming mechanism, cutting mechanism, and feeding mechanism including a rotary feed-wheel with periodically operating actuating means therefor, of means including an adjustable connection between the cutting mechanism and the feed-wheel whereby the latter is turned in a degree determined by the condition of adjustment of said connection during a period of inaction of said actuating means.

19. In a buttonhole sewing machine, the combination with stitch-forming mechanism, a cutting device, actuating means therefor including a cutter-shaft performing a single rotation during each cycle of operation of the machine and operatively connected with said cutting device, and feeding mechanism including a rotary feed-wheel provided with a ratchet element and connected with periodically operating actuating means, of means including a reciprocating carrier connected with the cutter-shaft, and a pawl on said carrier for engagement with the ratchet element of said feed-wheel whereby a partial rotation is imparted to the feed-wheel for each rotation of the cutter-shaft.

20. In a buttonhole sewing machine, the combination with stitch-forming mechanism, a cutting device, actuating means therefor including a cutter-shaft performing a single rotation during each cycle of operation of the machine and operatively connected with said cutting device, and feeding mechanism including a rotary feed-wheel provided with a ratchet element and periodically operating actuating means for said ratchet element, of means including a cam on the cutter-shaft, a reciprocating carrier connected therewith, and a pawl on said carrier for engagement with the ratchet element of said feed-wheel whereby a partial rotation is imparted to the feed-wheel for each rotation of the cutter-shaft.

21. In a buttonhole sewing machine, the combination with stitch-forming mechanism, a cutting device, actuating means therefor including a cutter-shaft performing a single rotation during each cycle of operation of the machine and operatively connected with said cutting device, and feeding mechanism including a rotary feed-wheel provided with a series of ratchet teeth and periodically operating actuating means for said ratchet element, of means including a cam on the cutter-shaft, a reciprocating carrier having an adjustable connection therewith, and a pawl on said carrier for engagement with said ratchet-teeth of the feed-wheel whereby a partial rotation is imparted to the feed wheel for each rotation of the cutter-shaft.

22. In a butonhole sewing machine, the combination with stitch-forming mechanism, a work-holder, and a cutting device comprising relatively reciprocable carriers sustaining coöperating cutting elements, of means for imparting to said cutting device traveling movements toward and from the stitch-forming mechanism, and means for imparting to said cutting elements reciprocal cutting movements from positions at opposite sides of the work-holder.

23. In a buttonhole sewing machine, the combination with stitch-forming mechanism, a work-holder, and a cutting device comprising carriers adapted for relative reciprocal movement and carrying respectively a block and a cutting knife, one of which is removable, said cutting device being adapted to perform its cutting actions out of the range of action of the stitch-forming mechanism, of means for moving said work-holder into cutting position for register with said cutting device, and means including an adjustable element whereby the work-holder is retracted into the range of action of the stitch-forming mechanism a distance adjustable to conform with the length of slit produced by said cutting device.

24. In a buttonhole sewing machine, the combination with stitch-forming mechanism, a work-holder, and a cutting device comprising relatively reciprocable carriers sustaining coöperating cutting elements of which one is removably mounted upon its respective carrier, to cut buttonhole slits of different length, said cutting device being adapted to perform its cutting actions out of the range of action of the stitch-forming mechanism, of means for imparting to said work-holder a uniform length of travel terminating in a fixed cutting position, means acting while the work-holder is in extreme position for actuating the cutting device to cut a buttonhole slit, actuating means connected with the travel-producing means whereby the work-holder is given step-by-step feeding movements toward and from one extreme position to space the edge-covering stitches, shifting means connected with said travel-producing means independently of said actuating means whereby the travel of the work-holder toward and from its opposite extreme position is effected, and means for effecting inversely adjustment of the respective periods of action of said actuating means and the shifting means for varying the relative lengths of traverse of the work-holder under the respective actions of said actuating and shifting means to thereby vary the length of the stitched buttonholes produced.

25. In a buttonhole sewing machine, the combination with stitch-forming mechanism, a stop-motion for controlling the same, a traveling work-holder, and a cutting device including a detachable cutting element and adapted to perform its cutting actions out of the range of action of the stitch-forming mechanism, of adjustable means whereby the work-holder is moved from cutting position to stitching position a distance conforming with the length of slit produced by said cutting device, means for operating the stop-motion to initiate the action of the stitch-forming mechanism, adjustable means controlled by the travel of the work-holder for tripping the stop-motion to arrest the stitch-forming mechanism, and means for moving the work-holder into cutting position preparatory to a succeeding cutting operation.

26. In a buttonhole sewing machine, the combination with stitch-forming mechanism, a cutting device comprising coöperating cutting elements, actuating means for said cutting device, and a work-holder having clamping members movable laterally toward and from each other, of spreading means for separating said clamping members and acting thereon while said cutting elements are closed upon the work.

27. In a buttonhole sewing machine, the combination with stitch-forming mechanism, a cutting device comprising coöperating cutting elements, actuating means for said cutting device, and a work-holder having clamping members movable laterally toward and from each other, of spreading means connected with the cutter-actuating means and including a rotary cam-button and a latch device therefor, said cam-button being adapted to be turned while the cutters are closed upon the work to separate the clamping members.

28. In a buttonhole sewing machine, the combination with stitch-forming mechanism and a cutting device including carriers normally retracted bodily laterally from cutting position and sustaining respectively a cutting knife and an opposed block, one of which is removable from its respective carrier, and a work-holder normally located in cutting position but out of register with the cutting device, of means whereby said work-holder and cutting device are caused to assume operative relation, and means acting independently thereof for producing a relative travel between the work-holder and the stitch-forming mechanism, which is adjustable to conform with the effective length of the coöperating portions of said cutting knife and block.

29. In a buttonhole sewing machine, the combination with stitch-forming mechanism, a cutting device mounted for substantial movement toward and from the stitch-forming mechanism and adapted to perform its cutting actions out of the range of action of the stitch-forming mechanism, and a work-holder normally disposed in cutting position, of means for shifting said work-holder from cutting to stitching position after a cutting action, means acting thereafter for imparting to the work-holder feeding movements to space the stitches, and means acting in the same operative cycle of the machine and immediately after the stitching operation to return the work-holder to cutting position.

30. In a buttonhole sewing machine, the combination with stitch-forming mechanism, a traveling cutting device comprising coöperating cutting elements each movable toward and from the stitch-forming mechanism and adapted to perform its cutting actions out of the range of action of the stitch-forming mechanism, and a work-holder normally disposed in cutting position and comprising separable clamping jaws, of means for closing the work-holder upon the work, means for shifting said work-holder from cutting to stitching position after a cutting action, means acting thereafter for imparting to the work-holder feeding movements to space the stitches, means acting after the stitching operation to return the work-holder to cutting position, and means for opening the work-holder subsequently to the stitching operation and before arrival in cutting position.

31. In a buttonhole sewing machine, the combination with stitch-forming mechanism, a cutting device adapted to perform its cutting actions out of the range of action of the stitch-forming mechanism, a work-holder, a rotary feed-wheel adapted to move the work-holder between cutting position and the extreme stitching position more remote therefrom, means for imparting to the feed-wheel a step-by-step partial rotary movement during the action of the stitch-forming mechanism, means for imparting to the feed-wheel partial rotations in the same direction before and after each stitching operation to shift the work-holder into and out of cutting position, and means independent of the feed-wheel for actuating the cutting device.

32. In a buttonhole sewing machine, the combination with stitch-forming mechanism, a stop-motion for controlling the same, a cutting device adapted to perform its cutting actions out of the range of action of the stitch-forming mechanism, actuating means therefor, a work-holder, and a rotary feed-wheel adapted to move the work-holder between cutting position and the extreme stitching position more remote therefrom, of means for imparting to the feed-wheel a step-by-step partial rotary movement during the action of the stitch-forming mechanism, means including an adjustable element connected with and controlled in its range of action by the cutter-actuating means for imparting to the feed-wheel a partial rotation preparatory to a stitching operation, and means controlled in its range of action by the stop-motion for imparting to the feed-wheel a partial rotation subsequent to the action of the stitch-forming mechanism.

33. In a buttonhole sewing machine, the combination with a shaft, stitch-forming mechanism deriving operative movements therefrom, a cam mounted upon said shaft, a work-holder comprising a pivotally mounted clamping arm and a controlling rock-shaft therefor carrying a tappet-arm, feeding mechanism connected with said work-holder and actuated independently of said cam, a rock-lever having an arm adapted for engagement with said tappet-arm for turning the rock-shaft to open the work-holder, and means for establishing operative connection between said rock-lever and said cam.

34. In a buttonhole sewing machine, the combination with a shaft, stitch-forming mechanism deriving operative movements therefrom, a stop-motion for controlling said shaft, a normally operative thread-tension device, and a work-holder constructed with separable clamping members, of work-holder opening means connected with and actuated by said stop-motion, and tension-releasing means connected with said stop-motion independently of the work-holder opening means.

35. In a buttonhole sewing machine, the combination with a shaft, stitch-forming mechanism deriving operative movements therefrom and comprising coöperating upper thread and lower thread carrying elements, a stop-motion for controlling said shaft, normally operative upper-thread and lower-thread tension devices, and a work-holder constructed with separable clamping members, of work-holder opening means connected with and actuated by said stop-motion, and means connected with the stop-motion for simultaneously acting upon the upper-thread and lower-thread tension devices to relieve the tension upon their respective threads.

36. In a buttonhole sewing machine, the combination with stitch-forming mechanism, a normally active thread-tension device, a work-holder, and means for producing relative feeding movements between the stitch-forming mechanism and the work and comprising a rotary feed-wheel with means for imparting thereto a partial rotation during said feeding movements, of means acting after the completion of the operation of the stitch-forming mechanism for causing the turning of the feed-wheel into initial position, and means connected therewith for relieving the action of said tension device upon the thread.

37. In a buttonhole sewing machine, the combination with stitch-forming mechanism comprising a reciprocating needle, and a thread-carrying looper coöperating therewith, a work-holder, normally operative upper-thread and lower-thread tension devices arranged respectively above and below said work-holder, and feeding mechanism for producing relative feeding movements between the work-holder and the stitch-forming mechanism, of automatically acting means engaging said tension devices for relieving the action of the same upon the threads at the completion of the period of action of the stitch-forming mechanism.

38. In a buttonhole sewing machine, the combination with stitch-forming mechanism, a stop-motion device including a cam and a follower therefor for controlling the period of action of the stitch-forming mechanism, and a normally operative thread-tension device, of tension-releasing means, and an operative connection between the same and said follower of the stop-motion device whereby the tension-releasing means is rendered respectively effective and ineffective in its relation to the tension device by the actuation of the stop-motion device in stopping and starting the operation of the stitch-forming mechanism, the action of said cam upon the follower being timed to insure the release of the tension at the instant of completion of the final stitch-forming cycle of a stitching period.

39. In a buttonhole sewing machine, the combination with a shaft, stitch-forming mechanism deriving operative movements therefrom, a thread-tension device, a stop-motion for controlling the operation of said shaft, fabric-cutting mechanism, and means independent of said shaft for actuating the same, of tension-releasing means operatively connected with said stop-motion and adapted to interrupt the action of the tension device upon the thread when said shaft is arrested, and an operative connection between said tension device and the actuating means for the fabric-cutting mechanism whereby said shaft is set in motion and the tension-releasing means is rendered ineffective.

40. In a buttonhole sewing machine, the combination with a stitch-forming mechanism, and a work-holder, of feeding mechanism comprising three separate actuating devices each independent of the others, whereby traveling movements are imparted to the work-holder in three stages at varying speeds during each cycle of operation of the machine.

41. In a buttonhole sewing machine, the combination with stitch-forming mechanism, and a work-holder, of a rotary feed-wheel connected with said work-holder, and three successively acting actuating mechanisms for said feed-wheel.

42. In a buttonhole sewing machine, the combination with stitch-forming mechanism, and a work-holder, of a rotary feed-wheel connected with said work-holder, and three successively acting actuating mechanisms for said feed-wheel each working at a different speed from the others.

43. In a buttonhole sewing machine, the combination with stitch-forming mechanism, and a work-holder, of a rotary feed-wheel connected with said work-holder, means for imparting to the feed-wheel an initial partial rotation in a continuous movement, means for thereafter imparting to the feed-wheel a step-by-step partial rotation, and means for completing a full rotation of the feed-wheel at a different speed from that of said step-by-step partial rotation.

44. In a buttonhole sewing machine, the combination with stitch-forming mechanism and a cutting device including a cutting element, and a work-holder normally occupying an initial position laterally out of register with both of the same, of means for producing between said work-holder and cutting device lateral traveling movements transverse to the direction of movement of said cutting element upon the work, whereby the work-holder and cutting device are caused to assume operative relation for a cutting action and for thereafter imparting to said device a cutting action, and means acting at a different time from the first-named means whereby said work-holder and stitch-forming mechanism are caused to assume operative relation.

45. In a buttonhole sewing machine, the combination with stitch-forming mechanism and a cutting device normally spaced apart, and a work-holder occupying initially a position laterally out of register with both of the same, of means for producing successively relative shifting movements between the work-holder and the stitch-forming mechanism and the cutting device, respectively, and thereby establishing successively operative relation of the work-clamp with the cutting device and the stitch-forming mechanism.

46. In a buttonhole sewing machine, the combination with stitch-forming mechanism, a cutting device, and a work-holder initially out of register with both the stitch-forming mechanism and cutting device, of means for successively shifting the cutting device into register with the work-holder and actuating the cutting device to cut a buttonhole slit and for thereafter retracting the cutting device, and means for shifting the work-holder into register with the stitch-forming mechanism and for thereafter retracting the same to initial position.

47. In a buttonhole sewing machine, the combination with stitch-forming mechanism, cutting mechanism, and feeding mechanism with periodically operating actuating means therefor, of means including ratchet-and-pawl mechanism under the control of the cutting mechanism for operating the feeding mechanism while the stitch-forming mechanism is inactive.

48. In a buttonhole sewing machine, the combination with stitch-forming mechanism, cutting mechanism, and feeding mechanism including a rotary feed-wheel with periodically operating actuating means therefor, of means including a reciprocatory pawl-carrier and a pawl mounted thereon for turning the feed-wheel during the period of inaction of said actuating means, and means whereby the length of travel of said pawl-carrier may be adjusted.

49. In a buttonhole sewing machine, the combination with stitch-forming mechanism, cutting mechanism, and feeding mechanism including a rotary feed-wheel with periodically operating actuating means therefor, of a reciprocatory pawl-carrier and a pawl mounted thereon and adapted for engagement with the feed-wheel for turning the latter, pawl-carrier actuating means adapted to produce a single traverse of the pawl-carrier between extreme positions for each cutting action, and means whereby the length of traverse of the pawl-carrier may be adjusted.

50. In a buttonhole sewing machine, the combination with stitch-forming mechanism, a stop-motion for controlling the same, a cutting device adapted to perform its cutting actions out of the range of action of the stitch-forming mechanism, actuating means therefor, a work-holder, and a rotary feed-wheel adapted to move the work-holder between cutting position and the extreme stitching position more remote therefrom, of means for imparting to the feed-wheel a step-by-step partial rotary movement during the action of the stitch-forming mechanism, means, including an adjustable element, for imparting to the feed-wheel a partial rotation preparatory to a stitching operation, and means controlled in its range of action by the stop-motion for imparting to the feed-wheel a partial rotation subsequent to the action of the stitch-forming mechanism.

51. In a buttonhole sewing machine, the combination with stitch-forming mechanism and a cutting device normally occupying initial positions laterally spaced apart, and a work-holder initially occupying a position intermediate the stitch-forming mechanism and the cutting device, of means acting while the stitch-forming mechanism is inactive for imparting to both the work-holder and the cutting device reciprocal traveling movements toward and from each other to cause them to assume coöperating relation intermediate said initial positions, and means independent thereof for actuating the cutting device to perform a cutting action.

52. In a buttonhole sewing machine, the combination with stitch-forming mechanism and a cutting device including opposed cutting elements movable in a path permanently out of the range of action of the stitch-forming mechanism and normally disposed in a position laterally remote from the stitch-forming mechanism, and a work-holder normally occupying an initial position out of the range of action of the stitch-forming mechanism and intermediate the latter and the retracted position of said cutting elements, of means for producing between said work-holder and cutting device lateral traveling movements to bring them into operative relation and to thereafter close the cutting elements upon the work, and means for bringing the work-holder and stitch-forming mechanism into operative relation.

53. In a buttonhole sewing machine, the combination with stitch-forming mechanism and a cutting device including a cutting element movable in a path permanently out of the range of action of the stitch-forming mechanism and normally disposed in a position laterally remote from the stitch-forming mechanism, and a work-holder normally occupying an initial position between the stitch-forming mechanism and the retracted position of said cutting element, of means for imparting to said cutting element successive traveling and cutting movements in angularly disposed substantially rectilinear paths embracing the initial position of the work-holder and out of the range of action of the stitch-forming mechanism, and means for thereafter bringing the work-holder and stitch-forming mechanism into operative relation.

54. In a buttonhole sewing machine, the combination with stitch-forming mechanism and a cutting device including a cutting element, and a work-holder normally occupying an initial position laterally out of register with both of the same, of independent and successively acting means for imparting to the cutting device a lateral movement into register with the work-holder followed by a cutting movement, and means for thereafter bringing the work-holder and stitch-forming mechanism into operative relation.

55. In a buttonhole sewing machine, the combination with two independently driven actuating shafts, stitch-forming mechanism, a work-holder, and a cutting device operative permanently out of the range of action of the stitch-forming mechanism, of means including independent connections with said shafts respectively whereby the work-holder is caused respectively to move from stitching position into operative relation with the cutting device at one rate of speed, and to return to stitching position at a higher rate of speed.

56. In a buttonhole sewing machine, the combination with stitch-forming mechanism, and cutting mechanism including cutting elements operative permanently out of the range of action of the stitch-forming mechanism, a traveling work-holder normally occupying an initial position within the range of action of said cutting elements, actuating means connected with the work-holder and confined in its period of effective action to that of the stitch-forming mechanism in the production of relative feeding movements between the stitch-forming mechanism and the work, of means acting during a period of ineffectiveness of said actuating means for imparting traveling movements to the work-holder and comprising operative connections with the cutting mechanism and with driving means independent thereof including a positively acting element.

57. In a buttonhole sewing machine, the combination with stitch-forming mechanism, and cutting mechanism including cutting elements operative permanently out of the range of action of the stitch-forming mechanism, and a traveling work-holder normally occupying an initial position within the range of action of said cutting elements, of a rotary feed-wheel connected with the work-holder, actuating means therefor, and a driving connection between said feed-wheel and the cutting mechanism.

58. In a buttonhole sewing machine, the combination with a shaft, stitch-forming mechanism operatively connected therewith, a stop-motion device including a cam mounted upon and rotating in unison with said shaft and a follower for positive engagement with said cam in arresting the movement of said shaft, and a normally operative thread tension device, of tension-releasing means, and an operative connection between the same and said follower of the stop-motion device whereby the tension-releasing means is rendered respectively effective and ineffective in its relation to the tension device by the actuation of the stop-motion device in stopping and starting the operation of said shaft.

59. In a buttonhole sewing machine, the combination with stitch-forming mechanism, a work-holder, and a cutting device adapted to perform its cutting actions out of the range of action of the stitch-forming mechanisms, of a feed-wheel operatively connected with the work-holder, means connected with and acting through the feed-wheel to impart to the work-holder a single-step movement between cutting and stitching positions, and means connected with the feed-wheel independently of the first-named means and acting through the feed-wheel to impart to the work-holder a step-by-step travel while in operative relation with the stitch-forming mechanism for spacing the stitches.

In testimony whereof, I have signed my name to this specification, in the presence of two subscribing witnesses.

EDWARD B. ALLEN.

Witnesses:
 HENRY J. MILLER,
 HENRY A. KORNEMANN, Jr.

It is hereby certified that in Letters Patent No. 1,209,926, granted December 26, 1916, upon the application of Edward B. Allen, of Bridgeport, Connecticut, for an improvement in "Buttonhole Cutting and Stitching Machines," errors appear in the printed specification requiring correction as follows: Page 9, line 121, claim 10, strike out the word "mechanism"; page 13, line 94, claim 40, strike out the article "a"; page 15, line 101, claim 59, for the word "mechanisms" read *mechanism;* and that the said Letters Patent should be read with these corrections therein that the same may conform to the record of the case in the Patent Office.

Signed and sealed this 30th day of January, A. D., 1917.

[SEAL.] F. W. H. CLAY,

*Acting Commissioner of Patents.*

Cl. 112—4.